(12) United States Patent
Cho et al.

(10) Patent No.: US 9,509,453 B2
(45) Date of Patent: Nov. 29, 2016

(54) APPARATUS AND METHOD FOR RECEIVING ACK IN WIRELESS NETWORK

(71) Applicant: Chung-Ang University Industry-Academy Cooperation Foundation, Dongjak-gu, Seoul (KR)

(72) Inventors: Sung Rae Cho, Seoul (KR); Woong Soo Na, Osan-si (KR); Jeong Seok Yu, Uiwang-si (KR); Hyoung Chul Bae, Seoul (KR); Tae Jin Kim, Seoul (KR); Ju Ho Lee, Seoul (KR); Zeynep Vatandas, Seoul (KR); Jun Beom Hur, Yongin-si (KR); Yun Seong Lee, Seoul (KR)

(73) Assignee: CHUNG-ANG UNIVERSITY INDUSTRY-ACADEMY COOPERATION FOUNDATION, Seoul (KR)

(*) Notice: Subject to any disclaimer, the term of this patent is extended or adjusted under 35 U.S.C. 154(b) by 20 days.

(21) Appl. No.: 14/324,184

(22) Filed: Jul. 5, 2014

(65) Prior Publication Data

US 2015/0055538 A1    Feb. 26, 2015

(30) Foreign Application Priority Data

Jul. 19, 2013 (KR) .................. 10-2013-0085165

(51) Int. Cl.
| | |
|---|---|
| *H04L 1/18* | (2006.01) |
| *H04W 4/08* | (2009.01) |
| *H04L 12/18* | (2006.01) |
| *H04L 1/00* | (2006.01) |

(52) U.S. Cl.
CPC ............ *H04L 1/1858* (2013.01); *H04L 1/188* (2013.01); *H04L 1/1854* (2013.01); *H04W 4/08* (2013.01); *H04L 12/1868* (2013.01); *H04L 2001/0093* (2013.01)

(58) Field of Classification Search
CPC ... H04L 1/1854; H04L 1/1858; H04L 1/188; H04L 2001/0093; H04W 4/08
USPC .......................................... 370/312
See application file for complete search history.

(56) References Cited

U.S. PATENT DOCUMENTS

| | | | |
|---|---|---|---|
| 6,574,668 B1 * | 6/2003 | Gubbi ................... | H04L 1/1614 709/231 |
| 2007/0291646 A1 * | 12/2007 | Ohishi ................... | H04L 1/1678 370/236 |
| 2008/0062178 A1 * | 3/2008 | Khandekar ........... | H04L 67/306 345/440 |

(Continued)

OTHER PUBLICATIONS

Technical proposal for IEEE 802.15.8; Jeongseok Yu, et al; Chung-Ang University, Korea; Jul. 2013; pp. 1-29.

(Continued)

*Primary Examiner* — Un C Cho
*Assistant Examiner* — Shah Rahman
(74) *Attorney, Agent, or Firm* — Lucas & Mercanti, LLP

(57) ABSTRACT

The present invention discloses a method for providing reliable multicasting service in wireless network. The disclosed method groups a plurality of receiving nodes into a plurality of receiving groups, and decides the ACK transmission time point against each receiving group, which is not overlapped with other receiving groups. The receiving node contained in each receiving group transmits ACK against the received data frame at the ACK transmission time point, which is decided according to the corresponding receiving group.

15 Claims, 11 Drawing Sheets

(56) References Cited

U.S. PATENT DOCUMENTS

| | | | | |
|---|---|---|---|---|
| 2009/0010198 A1* | 1/2009 | Boariu | ............... | H04L 1/1854 370/315 |
| 2009/0067358 A1* | 3/2009 | Fischer | ............... | H04L 12/1868 370/312 |
| 2009/0147720 A1* | 6/2009 | Wang | ............... | H04L 1/0003 370/312 |
| 2012/0076020 A1* | 3/2012 | Kim | ............... | H04L 12/1868 370/252 |
| 2013/0250836 A1* | 9/2013 | Shiotani | ............... | H04W 4/06 370/312 |
| 2014/0161016 A1* | 6/2014 | Morioka | ............... | H04L 1/1861 370/312 |
| 2014/0355493 A1* | 12/2014 | Niu | ............... | H04L 12/189 370/280 |

OTHER PUBLICATIONS

Technical proposal for IEEE 802.15.8; Jeongseok Yu, et al; Chung-Ang University, Korea; May 2013; pp. 1-116.

\* cited by examiner

FIG 7
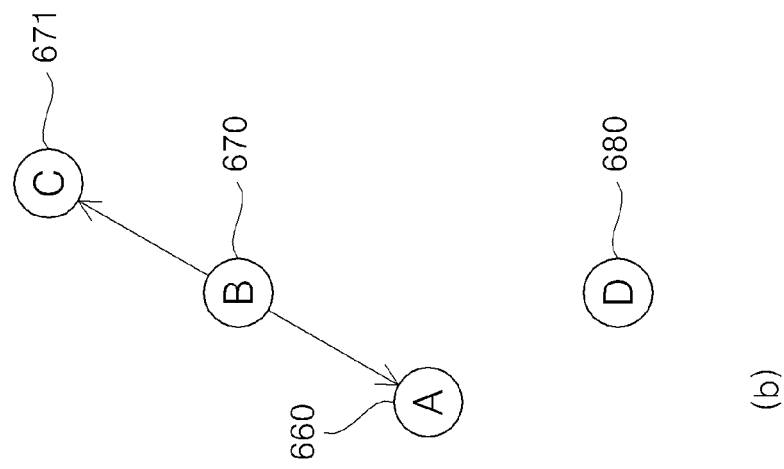
(b)
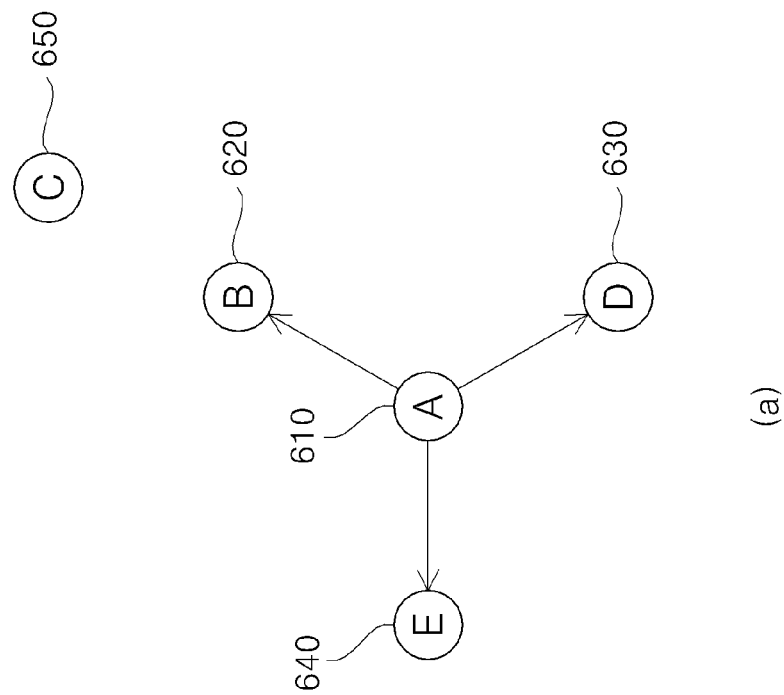
(a)

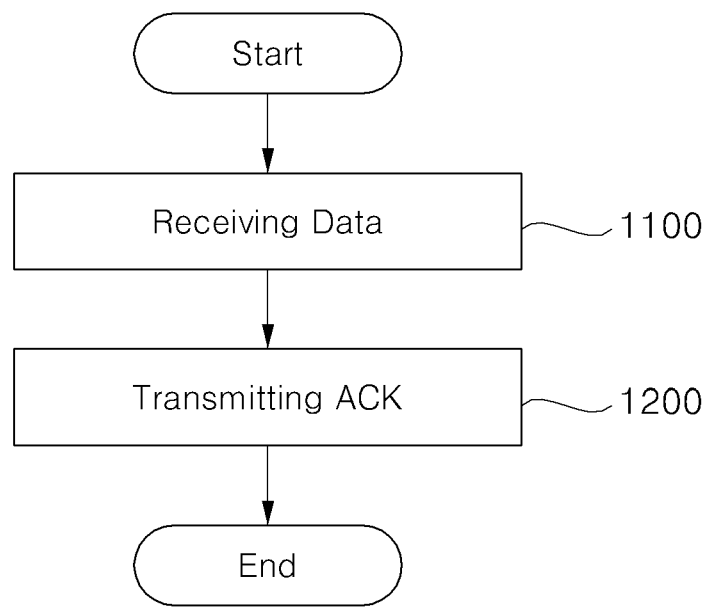

APPARATUS AND METHOD FOR RECEIVING ACK IN WIRELESS NETWORK

CROSS-REFERENCE TO RELATED APPLICATIONS

This application claims the benefit of Korean Patent Application No. 10-2013-0085165, filed Jul. 19, 2013, the content of which is incorporated herein by reference.

FIELD OF THE INVENTION

The present invention relates to wireless network, and more particularly, to a method for receiving ACK in wireless network.

BACKGROUND OF THE INVENTION

Cellular mobile communication technology is technology for providing communication service to a wireless device using infrastructure such as a base station wireless device. However, demands for technology, which is about using the communication service without infrastructure such as a base station by means of recognizing wireless devices with one another and directly transmitting data between wireless devices with one another, are increasing. In the case of the communication service without the infrastructure, in order to transmit data from each wireless device to other wireless devices, the data may go through other wireless devices.

When using this technique, multicast service, which generates a multicasting group by grouping wireless devices having the same concern, and transmit data to wireless devices contained in the multicasting group, is needed.

In the case of the communication service with infra such as cellular mobile communication, the multicast data is directly transmitted from the infra such as a base station to a wireless device. Accordingly, data transmission is relatively simple and, reliable multicast service is easy.

However, in the case of the communication service without the infra, in order to transmit the multicast data from a source wireless device to a target wireless device, the data may go through a plurality of wireless devices. In this case, it may be difficult to provide reliable multicast service.

SUMMARY OF THE INVENTION

The present invention has been made in an effort to solve the above-described problems associated with prior art.

The present invention is objected to provide a multicasting method, which is reliable in wireless network.

According to one embodiment of the present invention, provided is a transmission node, which comprises: a grouping unit grouping a plurality of receiving nodes into a plurality of receiving groups; a transmission unit transmitting data frame to the receiving nodes; and a receiving unit receiving ACKnowledge (ACK) against the data frame from the receiving node contained in each receiving group at the ACK transmission time point, which is decided not to be overlapped with other receiving groups according to each receiving group.

Herein, the number of the receiving group of the grouping unit may be decided in consideration of the number of the receiving node.

And, the receiving unit may receive ACK against previous data frame, which was transmitted before the ACK transmission time point but its ACK was not received yet, at the ACK transmission time point.

Further, the transmission unit may transmit the previous data frame again when the ACK against the previous data frame was not received, and may transmit the data frame again when the ACK against the data frame was not received.

Herein, the transmission unit may transmit ACK request message to the receiving node, and the receiving unit may response to the ACK request message and receive the ACK.

And, the transmission node may further comprise a timer manager, wherein the timer manager may set a timer when there is no data frame to be transmitted by the transmission unit, and the transmission unit may transmit ACK request message against the data frame, which did not received the ACK, to the receiving node when the timer is expired.

Further, the transmitted data frame may be forwarded from the receiving node to the other receiving node, and the receiving unit may receive ACK against the forwarded data frame.

According to another embodiment of the present invention, provided is a receiving node contained in any one receiving group of a plurality of receiving groups together with other member node receiving data frame from the transmission node, which comprises: a receiving unit receiving the data frame from the transmission node; and a transmission unit transmitting ACK against the data frame to the transmission node together with the member node at the ACK transmission time point, which is decided not to be overlapped with other receiving groups according to each receiving group containing the receiving node.

Herein, the transmission unit may transmit ACK against previous data frame, which was received before the ACK transmission time point but its ACK was not transmitted yet, at the ACK transmission time point.

And, the receiving unit may receive the previous data frame again based on the ACK against the previous data frame, and may receive the data frame again based on the ACK against the data frame.

Further, the receiving unit may receive ACK request message from the transmission node, and the transmission unit may response to the ACK request message and transmits the ACK.

According to still another embodiment of the present invention, provided is a method for operating a transmission node, which comprises the steps of: grouping a plurality of receiving nodes into a plurality of receiving groups; transmitting data frame to the receiving nodes; and receiving ACK against the data frame from the receiving node contained in each receiving group at the ACK transmission time point, which is decided not to be overlapped with other receiving groups according to each receiving group.

Herein, the step of receiving may receive ACK against previous data frame, which was transmitted before the ACK transmission time point but its ACK was not received yet, at the ACK transmission time point.

And, when the ACK against the previous data frame was not received, the previous data frame may be transmitted again, or when the ACK against the data frame was not received, the data frame may be transmitted again.

Further, the method may further comprise a step of transmitting ACK request message to the receiving node, and the step of receiving may response to the ACK request message and receive the ACK.

Herein, the method may further comprise a step of setting a timer when there is no data frame to be transmitted, and the step of transmitting ACK request message may transmit the ACK request message against the data frame, which did not received the ACK, to the receiving node when the timer is expired.

And, the transmitted data frame may be forwarded from the receiving node to the other receiving node, and the step of receiving may receive ACK against the forwarded data frame.

According to yet another embodiment of the present invention, provided is a method for operating a receiving node contained in any one receiving group of a plurality of receiving groups together with other member node receiving data frame from the transmission node, which comprises the steps of: receiving the data frame from the transmission node; and transmitting ACK against the data frame to the transmission node together with the member node at the ACK transmission time point, which is decided not to be overlapped with other receiving groups according to each receiving group containing the receiving node.

Herein, the step of transmitting may transmit ACK against previous data frame, which was received before the ACK transmission time point but its ACK was not transmitted yet, at the ACK transmission time point.

And, the method may further comprise a step of receiving the previous data frame again based on the ACK against the previous data frame, or receiving the data frame again based on the ACK against the data frame.

Further, the method may further comprise a step of receiving ACK request message from the transmission node, and the step of transmitting may response to the ACK request message and transmit the ACK.

ADVANTAGEOUS EFFECTS OF THE INVENTION

According to the following embodiments, the present invention may provide a reliable multicasting method in wireless network.

BRIEF DESCRIPTION OF DRAWINGS

The above and other objects and features of the present invention will become apparent from the following description of the invention taken in conjunction with the following accompanying drawings, which respectively show:

FIG. 7: a diagram illustrating conduct of reliable multicasting in communication network, which supports multihop in accordance with an exemplary embodiment;

FIG. 11: a flow chart representing the method for operating a receiving node according to an exemplary embodiment step by step.

DESCRIPTION OF SYMBOLS

110: Transmission node
120, 130, 140, 150, 160, 170: Receiving node

DETAILED DESCRIPTION OF THE INVENTION

Hereinafter, Examples of the present invention will be described in further detail with reference to the accompanying drawings.

Figure 1:
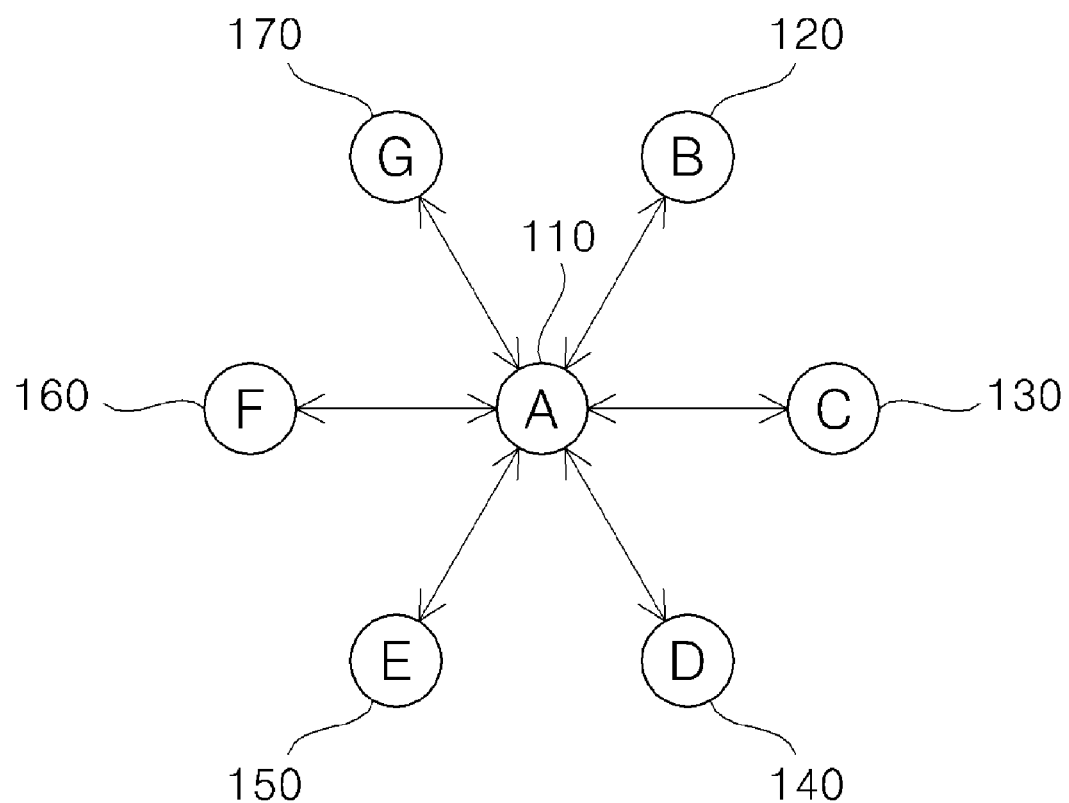
FIG. 1: a diagram illustrating a transmission node, which broadcasts data to a plurality of receiving nodes.

FIG. 1 is a diagram illustrating a transmission node, which broadcasts data to a plurality of receiving nodes.

The communication nodes 110, 120, 130, 140, 150, 160, 170 illustrated in FIG. 1 are communication nodes 110, 120, 130, 140, 150, 160, 170 contained in the same multicasting group. The multicasting group is made up of the communication nodes 110, 120, 130, 140, 150, 160, 170 having the same concern, or the communication nodes 110, 120, 130, 140, 150, 160, 170 using the same service, and the communication nodes 110, 120, 130, 140, 150, 160, 170 contained in the multicasting group may multicast data with one another.

In FIG. 1, the transmission node A 110 multicasting data may transmit data frame containing the data to the receiving nodes 120, 130, 140, 150, 160, 170 receiving data.

In one aspect, the data transmission may fail in the data transmission process. Or when the receiving node B 120 receives data frame from other transmission node, the data frame transmitted from the transmission node A 110 may crash with the data frame transmitted from other transmission node.

Thus, it is hard to the transmission node A 110 to judge whether the transmitted data frame is successfully transmitted or not.

In one aspect, the receiving nodes 120, 130, 140, 150, 160, 170 may transmit ACK against the data frame received from the transmission node A 110 to the transmission node A 110. The ACK is information formed when the receiving nodes 120, 130, 140, 150, 160, 170 received the data frame from the transmission node A 110 successfully, and the receiving nodes 120, 130, 140, 150, 160, 170 may transmit the ACK to the transmission node A 110. In one aspect, ACK (ACKnowledge) broadly used in communication network may be used as the ACK in the present invention. When the transmission node A 110 receives the ACK against the data frame, the transmission node A 110 may judge that the data frame is successfully transmitted.

In FIG. 1, the transmission node A 110 multicasts data frame containing data to the receiving nodes 120, 130, 140, 150, 160, 170. In this case, the data transmitted by the transmission node A 110 is transmitted to the receiving nodes 120, 130, 140, 150, 160, 170 almost at the same time. Thus, ACKs transmitted by each receiving nodes 120, 130, 140, 150, 160, 170 are transmitted to the transmission node A 110 almost at the same time. Thus, the ACKs transmitted by each receiving nodes 120, 130, 140, 150, 160, 170 are likely to crash with one another.

If the ACKs transmitted by each receiving nodes 120, 130, 140, 150, 160, 170 crash with one another, the transmission node A 110 does not receive the ACKs. Thus, the transmission node A 110 may transmit the corresponding data frame again. Because the transmission node A 110 retransmits the data frame, which has been already transmitted successfully, the efficiency of data transmission becomes lower.

In one aspect, the transmission node A 110 groups the receiving nodes 120, 130, 140, 150, 160, 170 contained in the multicasting group into a plurality of receiving groups, and may receive ACK at the ACK transmission time point, which is decided not to be overlapped with other receiving groups according to each receiving group.

For example, the transmission node A 110 may group the receiving node B 120 and the receiving node C 130 into the $1^{st}$ receiving group, and the receiving node D 140 and the receiving node E 150 into the $2^{nd}$ receiving group. Further, the transmission node A 110 may group the receiving node F 160 and the receiving node G 170 into the $3^{rd}$ receiving group.

In this case, the transmission node A 110 may receive ACKs from the receiving node B 120 and the receiving node C 130 contained in the $1^{st}$ receiving group at the $1^{st}$ ACK transmission time point. Further, it may receive ACKs from the receiving node D 140 and the receiving node E 150 contained in the $2^{nd}$ receiving group at the $2^{nd}$ ACK transmission time point, and may receive ACKs from the receiving node F 160 and the receiving node G 170 contained in the $3^{rd}$ receiving group at the $3^{rd}$ ACK transmission time point.

Figure 2:
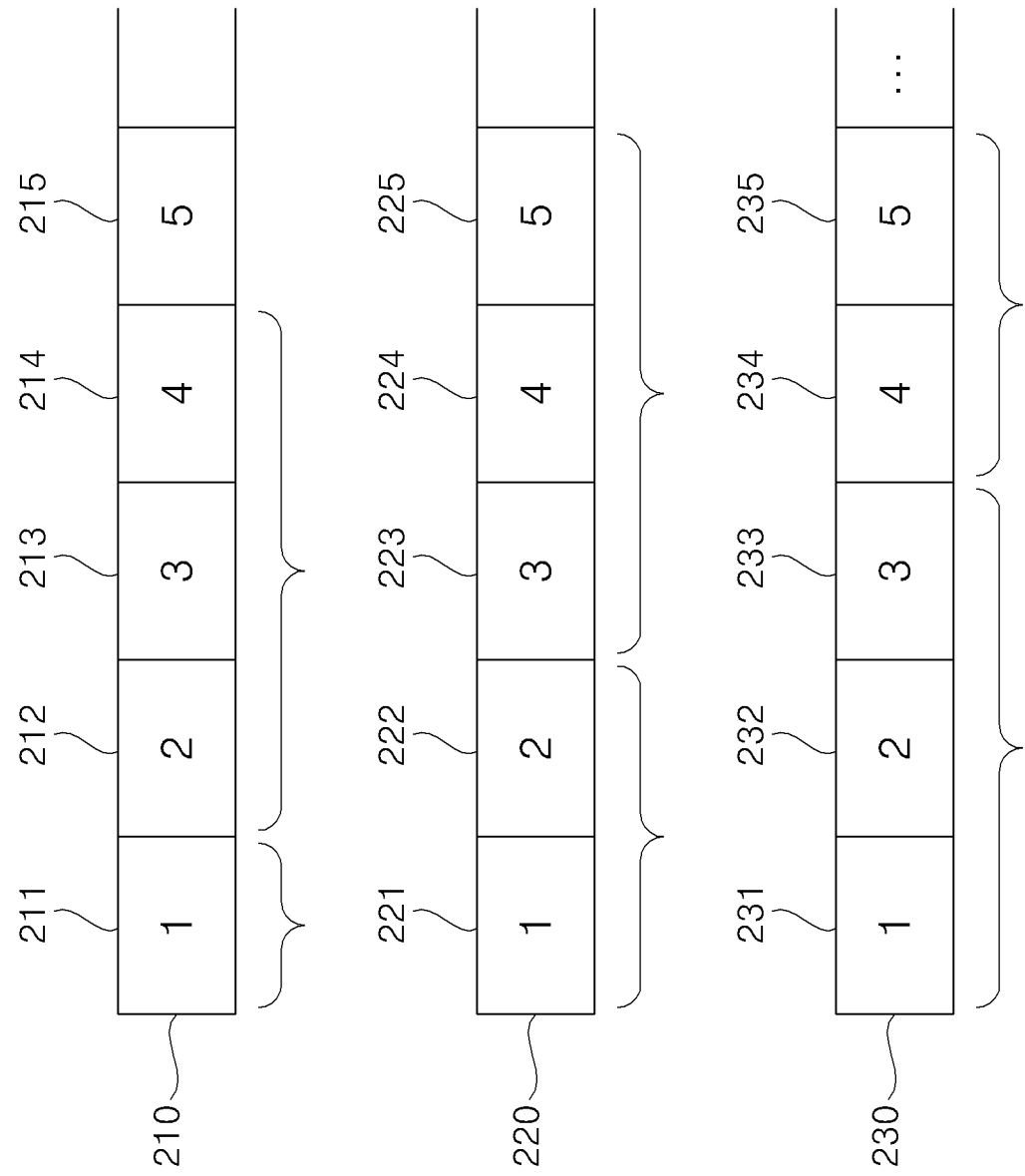
FIG. 2: diagrams illustrating an ACK transmission time point, which is decided not to be overlapped with other receiving groups according to each receiving group.

FIG. 2 is diagrams illustrating an ACK transmission time point, which is decided not to be overlapped with other receiving groups according to each receiving group.

The $1^{st}$ data stream 210 is data stream transmitted to the receiving node B 120 and the receiving node C 130 contained in the $1^{st}$ receiving group. Further, the $2^{nd}$ data stream 220 is data stream transmitted to the receiving node D 140 and the receiving node E 150 contained in the $2^{nd}$ receiving group, and the $3^{rd}$ data stream 230 is data stream transmitted to the receiving node F 160 and the receiving node G 170 contained in the $3^{rd}$ receiving group.

Each data streams 210, 220, 230 contain a plurality of data frames 211, 212, 213, . . . , 234, 235. The data frames assigned the same number (for example, data frames assigned 1, 211, 221, 231 etc.) are data frames containing exactly the same data.

In one aspect, the initial ACK transmission time point may be decided like "the time point receiving the $k^{th}$ data frame". Herein, the k may be a natural number assigned differently depending on each receiving group, value of the k may be less than or equal to the number of the receiving group N. In FIG. 2, the time point when the transmission of the $1^{st}$ data frame 211, 221, 231 is completed may be decided as the ACK transmission time point against the $1^{st}$ receiving group. Further, the time point when the transmission of the $2^{nd}$ data frame 212, 222, 232 is completed may be decided as the ACK transmission time point against the $2^{nd}$ receiving group, and the time point when the transmission of the $3^{rd}$ data frame 213, 223, 233 is completed may be decided as the ACK transmission time point against the $3^{rd}$ receiving group.

The transmission node A 110 may transmit the $1^{st}$ data frame 211, 221, 231 to the receiving nodes 120, 130, 140, 150, 160, 170. In this case, because the time point when the transmission of the $1^{st}$ data frame 211, 221, 231 is completed is the ACK transmission time point against the $1^{st}$ receiving group, the receiving node B 120 and the receiving node C 130 contained in the $1^{st}$ receiving group transmit the ACK against the $1^{st}$ data frame 211 to the transmission node A 110.

The transmission node A 110 may transmit the $2^{nd}$ data frame 212, 222, 232 to the receiving nodes 120, 130, 140, 150, 160, 170. In this case, because the time point when the transmission of the $2^{nd}$ data frame 212, 222, 232 is completed is the ACK transmission time point against the $2^{nd}$ receiving group, the receiving node D 140 and the receiving node E 150 contained in the $2^{nd}$ receiving group transmit the ACK against the $2^{nd}$ data frame 222 to the transmission node A 110.

In one aspect, the receiving node D 140 and the receiving node E 150 may transmit the ACK against previous data frame 221, which was received before the ACK transmission time point but its ACK was not transmitted yet, at the $2^{nd}$ ACK transmission time point. In this case, because the receiving node D 140 and the receiving node E 150 transmit the ACK against a plurality of data frames, the ACK transmitted by the receiving node D 140 and the receiving node E 150 may be simply called block ACKnowledge or block ACK.

The transmission node A 110 may transmit the $3^{rd}$ data frame 213, 223, 233 to the receiving nodes 120, 130, 140, 150, 160, 170. In this case, because the time point when the transmission of the $3^{rd}$ data frame 213, 223, 233 is completed is the ACK transmission time point against the $3^{rd}$ receiving group, the receiving node F 160 and the receiving node G 170 contained in the $3^{rd}$ receiving group transmit the ACK against the $3^{rd}$ data frame 223 to the transmission node A 110.

In one aspect, the receiving node F 160 and the receiving node G 170 may transmit the ACK against previous data frame 231, 232, which was received before the ACK transmission time point but its ACK was not transmitted yet, at the $3^{rd}$ ACK transmission time point. In this case, because the receiving node F 160 and the receiving node G 170 transmit the ACK against a plurality of data frames, the ACK transmitted by the receiving node F 160 and the receiving node G 170 may be simply called block ACKnowledge or block ACK.

Further, the later ACK transmission time point may be decided like "the time point when the receiving node receives N new data frames after the previous ACK transmission time point". In FIG. 2, the N may be 3. Referring to FIG. 2, the time point when the receiving node receives 3 new data frames 212, 213, 214 after the transmission of the $1^{st}$ data frame 211 was completed may be decided as the ACK transmission time point against the $1^{st}$ receiving group. Further, the time point when the receiving node receives 3 new data frames 223, 224, 225 after the transmission of the $2^{nd}$ data frame 222 was completed may be decided as the ACK transmission time point against the $2^{nd}$ receiving group.

According to Examples illustrated in FIG. 1 and FIG. 2, the transmission node A 110 may receive ACKs from up to 2 receiving nodes at each ACK transmission time point. Thus, the chances of crashing the ACKs, which are transmitted by the receiving nodes to the transmission node A 110, with one another is reduced, and the efficiency of the data transmission is improved.

Figure 3:
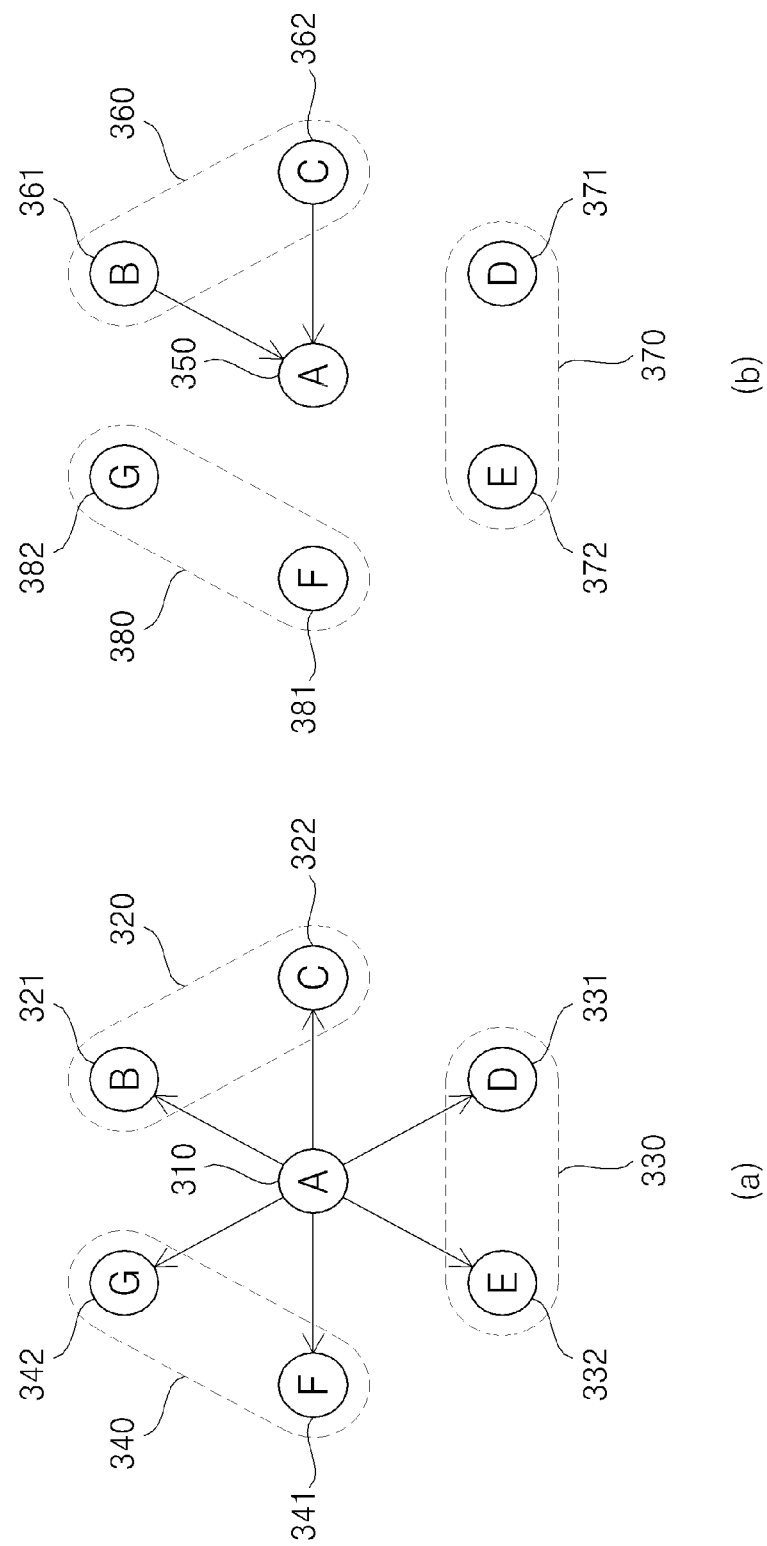
FIGS. 3 to 6: diagrams illustrating conduct of reliable data broadcasting by using block ACK in accordance with an exemplary embodiment.

FIG. 3 is diagrams illustrating that a transmission node receives ACK from a receiving node contained in the $1^{st}$ receiving group in accordance with an exemplary embodiment.

In FIG. 3(a), the transmission node A 310 transmits the $1^{st}$ data frame to the receiving nodes 321, 322, 331, 332, 341, 342. The receiving node B 321 and the receiving node C 322 are contained in the $1^{st}$ receiving group 320, and the receiving node D 331 and the receiving node E 332 are contained in the $2^{nd}$ receiving group 330. The receiving node F 341 and the receiving node G 342 are contained in the $3^{rd}$ receiving group 340.

In FIG. 3, with regard to the $1^{st}$ receiving group 320, the time point when the $3n+1^{th}$ (herein, n is 0 or natural number)

data frame, for example, the $1^{st}$ data frame, the $4^{th}$ data frame, etc. is received completely may be decided as the ACK transmission time point.

In FIG. 3(b), at ACK transmission time point of the $1^{st}$ receiving group 360, the receiving node B 361 and the receiving node C 362 contained in the $1^{st}$ receiving group 360 transmit the ACK to the transmission node A 350. However, the receiving node D 371, the receiving node E 372, the receiving node F 381 and the receiving node G 382 contained in the $2^{nd}$ receiving group 370 and the $3^{rd}$ receiving group 380 do not transmit the ACK.

Figure 4:
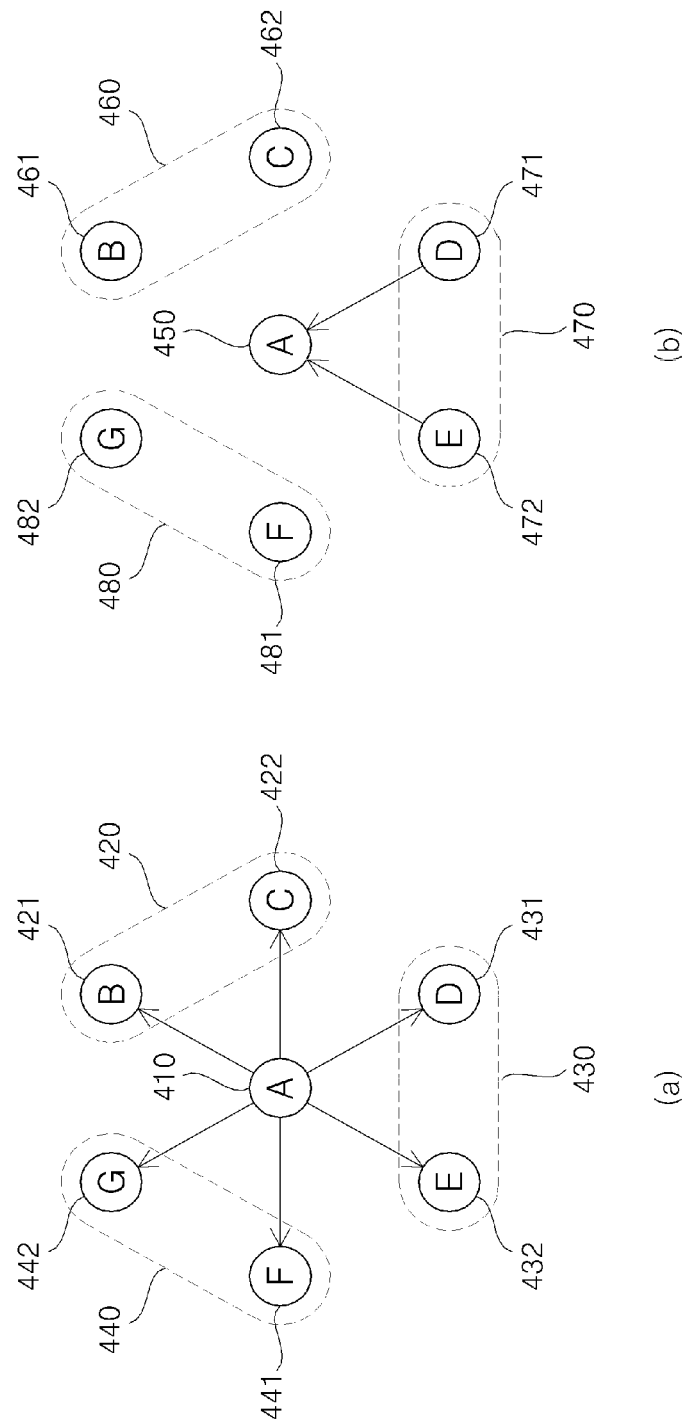

FIG. 4 is diagrams illustrating that a transmission node receives ACK from a receiving node contained in the $2^{nd}$ receiving group in accordance with an exemplary embodiment.

In FIG. 4(a), the transmission node A 410 transmits the $2^{nd}$ data frame to the receiving nodes 421, 422, 431, 432, 441, 442. The receiving node B 421 and the receiving node C 422 are contained in the $1^{st}$ receiving group 420, and the receiving node D 431 and the receiving node E 432 are contained in the $2^{nd}$ receiving group 430. The receiving node F 441 and the receiving node G 442 are contained in the $3^{rd}$ receiving group 440.

In FIG. 4, with regard to the $2^{nd}$ receiving group 430, the time point when the $3n+2^{th}$ (herein, n is 0 or natural number) data frame, for example, the $2^{nd}$ data frame, the $5^{th}$ data frame, etc. is received completely may be decided as the ACK transmission time point.

In FIG. 4(b), at the ACK transmission time point of the $2^{nd}$ receiving group 470, the receiving node D 471 and the receiving node E 472 contained in the $2^{nd}$ receiving group 470 transmit the ACK to the transmission node A 450.

The receiving node D 471 and the receiving node E 472 contained in the 2nd receiving group 470 did not transmit the ACK against the previously received $1^{st}$ data frame yet. Accordingly, the receiving node D 471 and the receiving node E 472 contained in the $2^{nd}$ receiving group 470 may transmit the ACK against the $1^{st}$ data frame, which did not transmit the ACK yet, and the ACK against the $2^{nd}$ data frame to the transmission node A 450.

Figure 5:
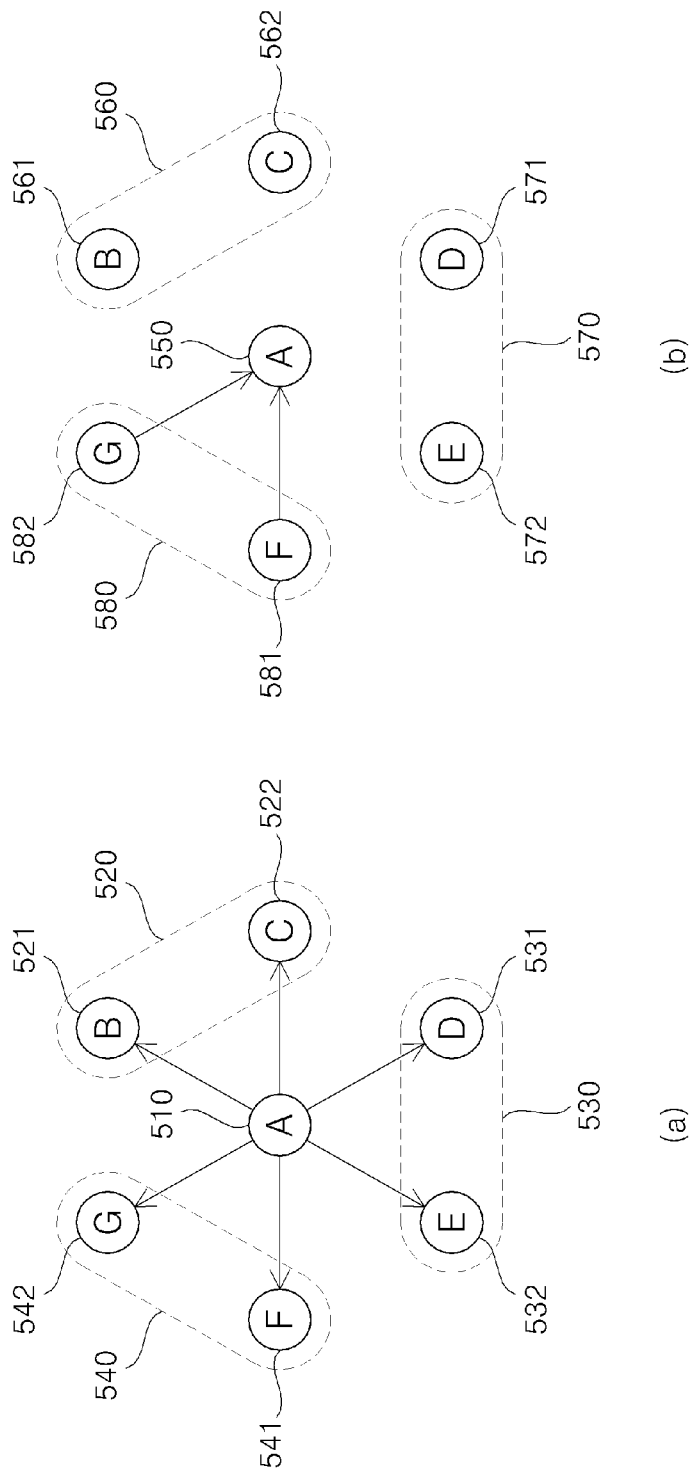

FIG. 5 diagrams illustrating that a transmission node receives ACK from a receiving node contained in the $3^{rd}$ receiving group in accordance with an exemplary embodiment.

In FIG. 5(a), the transmission node A 510 transmits the $3^{rd}$ data frame to the receiving nodes 521, 522, 531, 532, 541, 542. The receiving node B 521 and the receiving node C 522 are contained in the $1^{st}$ receiving group 520, and the receiving node D 531 and the receiving node E 532 are contained in the $2^{nd}$ receiving group 530. The receiving node F 541 and the receiving node G 542 are contained in the $3^{rd}$ receiving group 540.

In FIG. 5, with regard to the $3^{rd}$ receiving group 540, the time point when the $3n^{th}$ (herein, n is 0 or natural number) data frame, for example, the $3^{rd}$ data frame, the $6^{th}$ data frame, etc. is received completely may be decided as the ACK transmission time point.

In FIG. 5(b), at the ACK transmission time point of the $3^{rd}$ receiving group 570, the receiving node F 581 and the receiving node G 582 contained in the $3^{rd}$ receiving group 570 transmit the ACK to the transmission node A 550.

The receiving node F 581 and the receiving node G 582 contained in the $3^{rd}$ receiving group 470 did not transmit the ACK against the previously received $1^{st}$ data frame and $2^{nd}$ data frame yet. Accordingly, the receiving node F 581 and the receiving node G 582 contained in the $3^{rd}$ receiving group 580 may transmit the ACK against the $1^{st}$ data frame and the $2^{nd}$ data frame, which did not transmit the ACK yet, and the ACK against the $3^{rd}$ data frame to the transmission node A 550.

Figure 6:
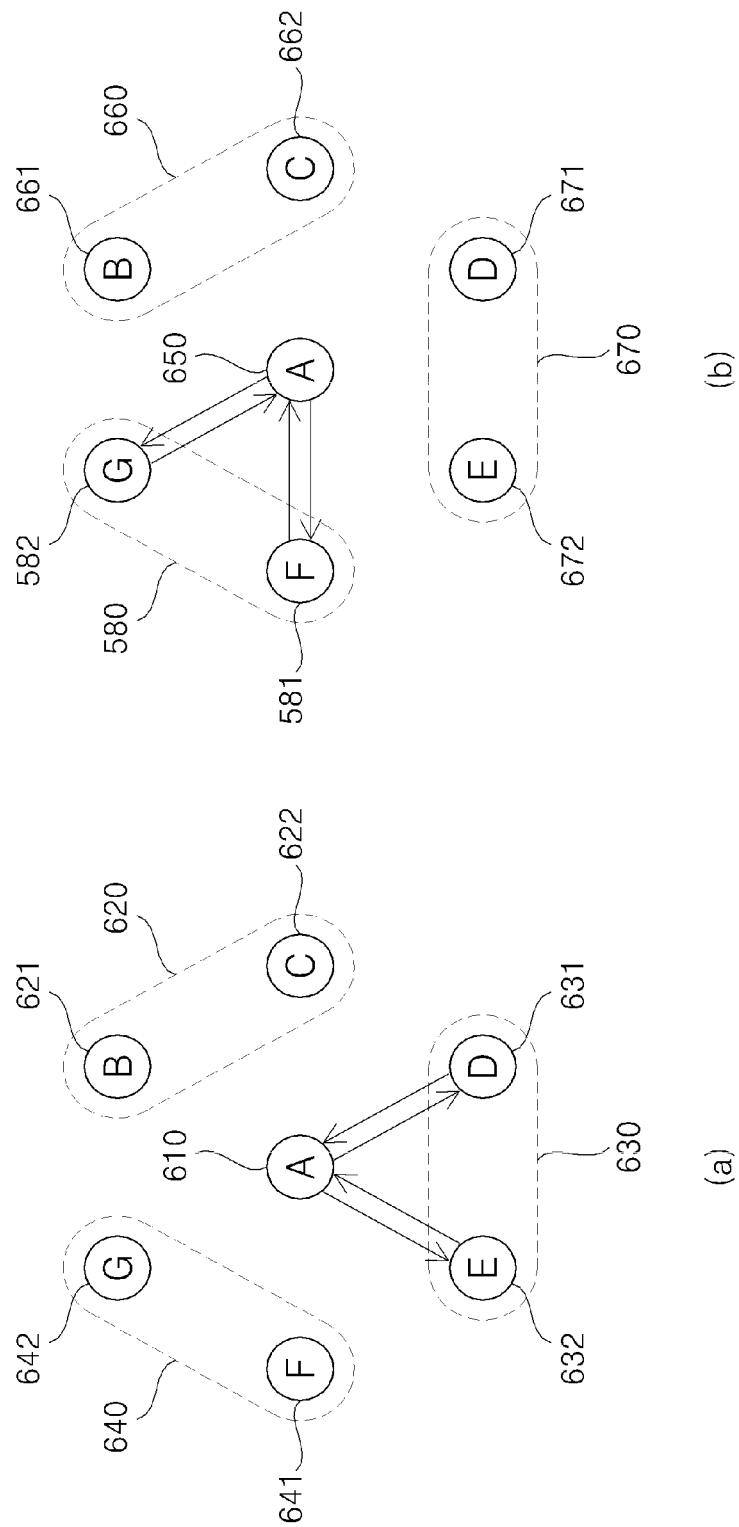

FIG. 6 is diagrams illustrating that a transmission node receives ACK using ACK request message in accordance with an exemplary embodiment.

In one aspect, as described in FIG. 3 to FIG. 5, the ACK transmission time point against each receiving group 620, 630, 640 may be decided as the time point of receiving the $3n+1^{th}$, $3n+2^{th}$ and $3n^{th}$ (herein, n is 0 or natural number) data frames, respectively.

In one aspect, the transmission node A 610 may transmit all data to be transmitted to each receiving node 621, 622, 631, 632, 641, 642. In this case, any one receiving group may be the ACK transmission time point, but other receiving group may not the ACK transmission time point yet.

In FIG. 6(a), when the transmission node A 610 transmitted the 3n+1 data frames thereby completing the transmission of all data frames, the receiving node B 621 and the receiving node C 622 contained in the $1^{st}$ receiving group 620 may transmit the ACK to the transmission node A 610 as the data frame receiving is completed.

However, in the case of the receiving node D 631 and the receiving node E 632 contained in the $2^{nd}$ receiving group 630, the ACK transmission time point is the time point when receiving the $3n+2^{th}$ data frame. Accordingly, the receiving node D 631 and the receiving node E 632 do not transmit the ACK to the transmission node 610 even after the data receiving is completed.

In this case, the transmission node A 610 may transmit the ACK request message to the receiving node D 631 and the receiving node E 632 contained in the $2^{nd}$ receiving group 630. The receiving node D 631 and the receiving node E 632 may response to the ACK request message and request the ACK against the previous data frame to the transmission node A 610.

In FIG. 6(b), the receiving node B 661 and the receiving node C 662 contained in the $1^{st}$ receiving group 660 transmitted the ACK at the same time when the data transmission from the transmission node A 650 was completed.

Further, the receiving node D 671 및 receiving node E 672 contained in the $2^{nd}$ receiving group 670 responded to the ACK request message from the transmission node A 650 and then transmitted the ACK against the previous data frame to the transmission node A 650.

The receiving node F 681 and the receiving node G 682 contained in the $3^{rd}$ receiving group 680 receive the ACK request message from the transmission node A 650. The receiving node F 681 and the receiving node G 682 contained in the $3^{rd}$ receiving group 680 may response to the ACK request message and transmit the ACK against the previous data frame to the transmission node A 650.

FIG. 7 is a diagram illustrating conduct of reliable multicasting in communication network, which supports multihop in accordance with an exemplary embodiment.

In FIG. 7(a), the transmission node A 710 transmits data frame to the receiving nodes 720, 730, 740. Herein, the receiving node C 750 is a receiving node contained in the same multicasting group with the transmission node A 710 and the receiving nodes 720, 730, 740, but it is a receiving node located at the distance of 2-hop from the transmission node A 710, thereby it cannot directly receive the data frame from the transmission node A 710.

In FIG. 7(b), the receiving node B 770 forwards the data framed received from the transmission node A 760 to the receiving node C 771. At this time, the transmission node A 660 may receive the data frame forwarded from the receiving node B 670 to the receiving node C 771.

Only when the data frame is successfully transmitted to the receiving node B 770, the data frame may be forwarded from the receiving node B 770 to the receiving node C 771. Accordingly, when the transmission node A 760 receives the data frame forwarded from the receiving node B 770 to other receiving node, the transmission node A 760 can judge that the data frame is successfully transmitted. Accordingly, the transmission node A 760 may receive the forwarded data frame as the ACK.

Figure 8:
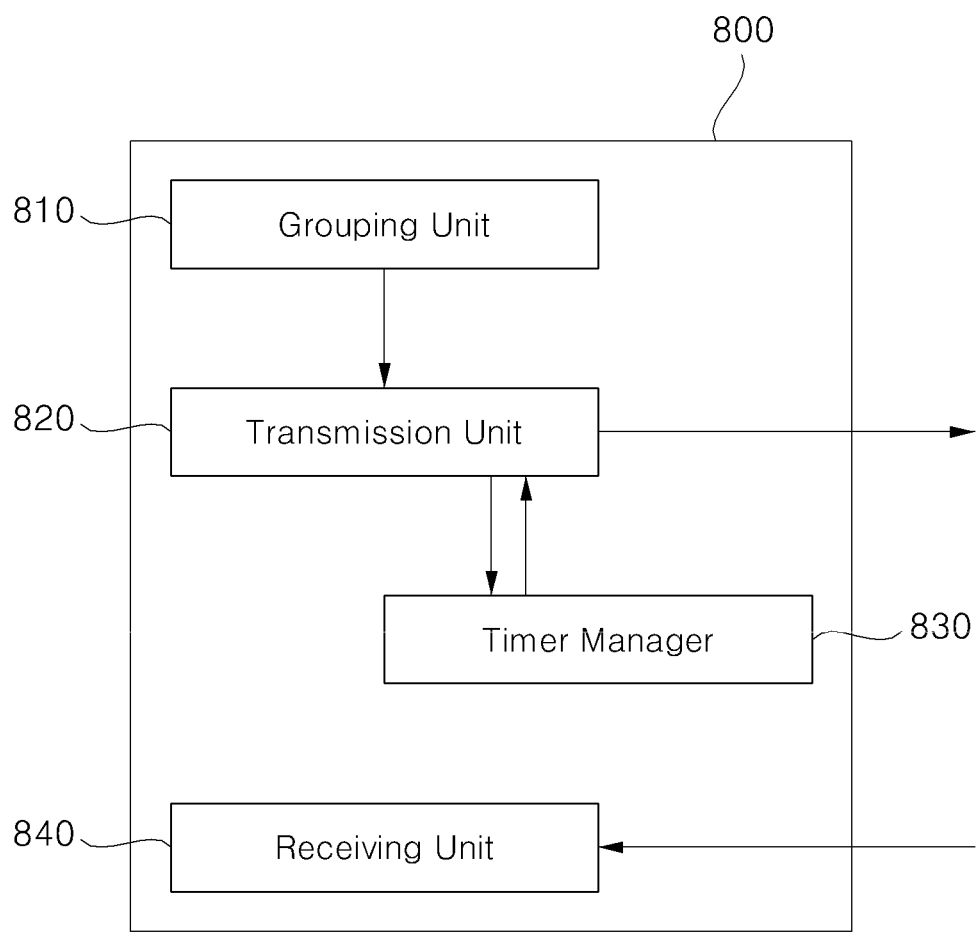
FIG. 8: a block diagram illustrating a structure of the transmission node according to an exemplary embodiment.

FIG. 8 is a block diagram illustrating a structure of the transmission node according to an exemplary embodiment.

According to an exemplary embodiment, the transmission node 800 contains the grouping unit 810, the transmission unit 820, the timer manager 830 and the receiving unit 840. The transmission node 800 multicasts the data frame to the receiving nodes.

The grouping unit 810 groups the receiving nodes, which receive the data frame from the transmission node 800, into a plurality of receiving groups. In one aspect, the grouping unit 810 may group the receiving groups as at least one receiving node is contained in each receiving group. Herein, the grouping unit 810 may decide the number of the receiving group in the consideration of the number of the receiving node. In one aspect, the ACK transmission time point may be decided depending on the receiving group. The ACK transmission time point may be decided not to be overlapped with other receiving groups depending on each receiving group.

The transmission unit 820 transmits the data frame containing the data to the receiving nodes.

The receiving unit 840 may receive the ACK against the data frame from the receiving nodes contained in each receiving group at the ACK transmission time point decided depending on each receiving group.

In one aspect, the ACK transmission time point may be decided like "the time point when the receiving node receives N new data frames after the previous ACK transmission time point". Herein, the N may be a natural number over '2'. In this case, when the receiving node receives the $N^{th}$ new data frame, the receiving node may hold the data frame received in the $N^{th}$ order and the N−1 previous data frames, which was received before but did not transmit the ACK yet.

Herein, the receiving unit 840 may receive the ACK against the previous data frame, which was transmitted before the ACK transmission time point, but the ACK was not received yet, at the ACK transmission time point.

In one aspect, the receiving unit 840 may do not receive the ACK against the data frame or the ACK against the previous data frame. In this case, the transmission unit 840 may retransmit the data frame, which did not receive the ACK to the receiving node.

In one aspect, the transmission unit 820 may transmit all data frames, which should be transmitted to each receiving nodes, and the transmission node 800 does not have any data frame to be transmitted. In this case, each receiving nodes may have not transmitted the ACK against the already received data frame to the transmission node 800 yet.

In this case, the transmission unit 800 may transmit the ACK request message to the receiving node. It is not yet the ACK transmission time point, but the receiving unit 800 may response to the ACK request message and then receive the ACK from the receiving node.

In one aspect, if the transmission node 800 does not have any data frame to be transmitted, the timer manager 830 may set a timer. If the ACK against the previously transmitted data frame is not received until the set timer is expired, the transmission unit 820 may transmit the ACK request message to the receiving node.

In one aspect, the data frame transmitted to the receiving node may be forwarded from the receiving node to other receiving node. In this case, the receiving unit 840 may receive the data frame forwarded from the receiving node to other receiving node. Only when the data frame is successfully transmitted to the receiving node, the data frame may be forwarded from the receiving node. Accordingly, when the receiving unit 840 receives the data frame forwarded to other receiving node, the receiving unit 840 may judge that the data frame is successfully transmitted. Accordingly, the receiving unit may receive the forwarded data frame as ACK.

Figure 9:
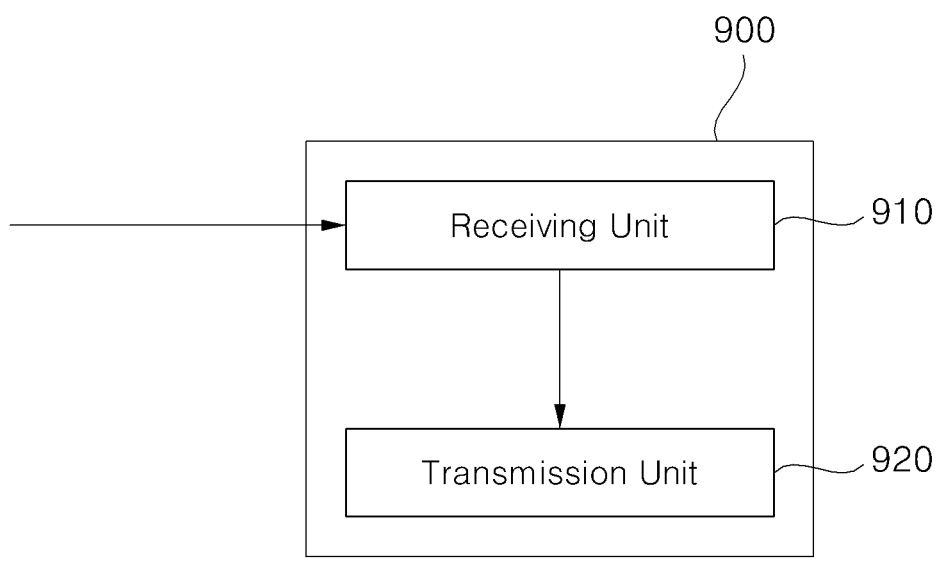
FIG. 9: a block diagram illustrating a structure of the receiving node according to an exemplary embodiment.

FIG. 9 is a block diagram illustrating a structure of the receiving node according to an exemplary embodiment.

According to an exemplary embodiment, the receiving node 900 contains the receiving unit 910 and the transmission unit 920.

The receiving unit 910 receives the data frame from the transmission node. Further, the receiving unit 910 may judge whether there is an error in the received data frame or not. If there is no error in the data frame received by the receiving unit 910, the receiving unit 910 may judge that the data frame is successfully received.

When the receiving unit 910 receives the data frame successfully, the transmission unit 920 may transmit the ACK against the received data frame to the transmission node. In one aspect, the receiving node 900 may be contained in a certain receiving group. Further, the ACK transmission time point may be decided depending on each receiving group. The ACK transmission time point decided depending on each receiving group may be decided not to be overlapped with one another. The transmission unit 920 may transmit the ACK against the data frame at the ACK transmission time point, which is decided depending on the receiving group containing the receiving node 900.

In one aspect, the ACK transmission time point may be decided like "the time point when receiving N new data frames after the previous ACK transmission time point". Accordingly, at a certain ACK transmission time point, the receiving node may have the previous data frame, which had been received between the previous ACK transmission time point and the certain ACK transmission time point, but its ACK was not transmitted yet. In this case, the receiving node may transmit the ACK against the previous data frame at the ACK transmission time point.

In one aspect, the receiving unit 910 may receive the previous data frame again based on the ACK against the data frame. For example, the receiving unit 910 may receive the data frame whose ACK is not transmitted yet again from the transmission node.

In one aspect, the receiving unit 910 may receive the ACK request message from the transmission node. The transmission unit 920 may transmit the ACK against the previous data frame to the transmission node even when it is not the ACK transmission time point.

In one aspect, the receiving unit 910 may receive the ACK request message from the transmission node. The transmission unit 920 may response to the ACK request message and transmit the ACK to the transmission node even when it is not the ACK transmission time point.

Figure 10:
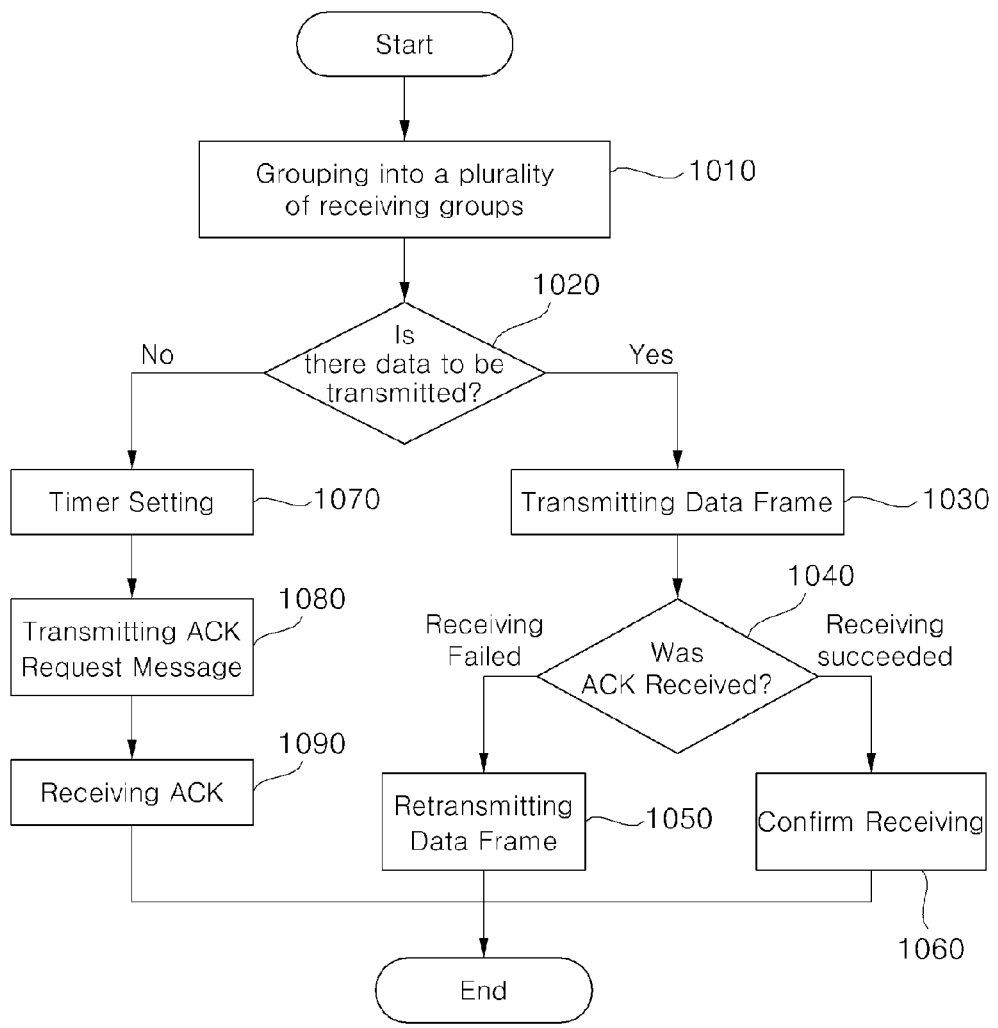
FIG. 10: a flow chart representing the method for operating a transmission node according to an exemplary embodiment step by step.

FIG. 10 is a flow chart representing the method for operating a transmission node according to an exemplary embodiment step by step.

In step 1010, the transmission node groups a plurality of receiving nodes, which receive the data frame from the transmission node, into the receiving group. In one aspect, the transmission node may group as at least one receiving node is contained in each receiving group.

In step 1020, the transmission node judges whether there is data frame to be transmitted to the receiving node. If there is data frame to be transmitted, the transmission node transmits the data frame to the receiving nodes in step 1030.

In one aspect, the ACK transmission time point may be decided depending on each receiving group. Further, the ACK transmission time point may be decided not to be overlapped with one another.

For example, the initial ACK transmission time point may be decided like "the time point receiving the $k^{th}$ data frame". Herein, the k may be a natural number assigned differently depending on each receiving group, and the value of the k may be less than or equal to the number of the receiving group N. Further, the later ACK transmission time point may be decided like "the time point when the receiving node receives N new data frames after the previous ACK transmission time point".

In step 1040, the transmission node receives the ACK against the data frame from the receiving node. In one aspect, the transmission node may receive the ACK against the previous data frame, which was transmitted before the ACK transmission time point but its ACK is not received yet, at the ACK transmission time point.

If the transmission node receives the ACK, in step 1060, the transmission node may judge that the data frame is successfully transmitted.

On the other hand, when the transmission node does not receive the ACK, in step 1050, the transmission node judges that the data frame is not transmitted, and then it may retransmit the data frame.

If the transmission node does not have any data frame to be transmitted to the receiving node in step 1020, the transmission node may set a timer in step 1070.

If the transmission node does not receive the ACK from the receiving node until the timer is expired, the transmission node may transmit the ACK request message to the receiving node in step 1080.

The receiving node receives the ACK request message, and may transmit all ACKs against the data frames, which did not reach to the ACK transmission time point yet thereby not transmitting their ACKs yet, to the transmission node.

In step 1090, the transmission node may receive the ACK from the receiving node even when it is not the ACK transmission time point.

In one aspect, the data frame transmitted to the receiving node may be forwarded from the receiving node to other receiving node. In this case, the transmission node may receive the data frame forwarded from the receiving node to other receiving node. The transmission node may receive the forwarded data frame as ACK.

FIG. 11 is a flow chart representing the method for operating a receiving node according to an exemplary embodiment step by step.

In step 1100, the receiving node receives the data frame from the transmission node.

In step 1200, the receiving node may transmit the ACK against the received data frame to the transmission node. In one aspect, the receiving node may be contained in a certain receiving group. Further, the ACK transmission time point may be decided depending on each receiving group. The ACK transmission time point decided depending on each receiving group may be decided not to be overlapped with one another. The receiving node may transmit the ACK against the data frame at the ACK transmission time point, which is decided depending on the receiving group containing the receiving node.

For example, the initial ACK transmission time point may be decided like "the time point receiving the $k^{th}$ data frame". Herein, the k may be a natural number assigned differently depending on each receiving group, and the value of the k may be less than or equal to the number of the receiving group N. Further, the later ACK transmission time point may be decided like "the time point when the receiving node receives N new data frames after the previous ACK transmission time point".

Thus, at a certain ACK transmission time point, the receiving node may have the previous data frame, which had been received between the previous ACK transmission time point and the certain ACK transmission time point, but its ACK was not transmitted yet. In this case, the receiving node may transmit the ACK against the previous data frame at the ACK transmission time point.

In one aspect, the receiving node may receive the previous data frame base on the ACK against the data frame again. For example, the receiving node may receive the data frame whose ACK is not transmitted yet from the transmission node.

In one aspect, the receiving node may receive the ACK request message from the transmission node. Even when it is the ACK transmission time point, the receiving node may transmit the ACK against the previous data frame to the transmission node.

The method according the embodiments may be embodied in the form of program command, which can be executed through various computer means, thereby it may be recorded on a computer readable media. The computer readable media may comprise program commands data files, data structures and the like alone or in combination thereof. The program command recorded on the media may be the one, which is specially designed or constituted for the embodiments, or the one, which is known in those skilled in the art and commercially available. Examples of the computer readable recording media may be magnetic media such as hard disks, floppy disks and magnetic tapes, optical media such as CD-ROMs and DVDs, magneto-optical media such as floptical disks, and hardware devices, which is specially configured to store and execute program command, such as read-only memory (ROM), random access memory (RAM) and flash memory. Examples of the program command may be high-level language code, which can be executed by a computer by using an interpreter and the like, as well as machine code, which is made by a compiler. The described hardware devices may be configured to act as one or more software modules in order to perform the operations of the above-described exemplary embodiments of the present invention, or vice versa.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A wireless communication system comprising a plurality of wireless devices operating without a separate infrastructure for coordinating between wireless devices, wherein at least one wireless device functions as a transmission node and at least one wireless device functions as a receiving node,
  wherein the transmission node comprises:
    a grouping unit grouping a plurality of wireless devices functioning as receiving nodes into a plurality of receiving groups;
    a transmission unit transmitting data frame directly to the receiving nodes, wherein the data frame is not transmitted to a separate infrastructure; and
    a receiving unit receiving ACKnowledge (ACK) against the data frame directly from the receiving node contained in each receiving group at the ACK transmission time point wherein the ACK is not transmitted to a separate infrastructure, which is decided not to be overlapped with other receiving groups according to each receiving group,
    wherein
      a first ACK transmission time point is decided to be when the receiving node contained in each receiving group receives $k^{th}$ data frame;
      a later ACK transmission time point is decided to be when the receiving node contained in each receiving group receives $N^{th}$ data frame after receiving previous ACK transmission time point; and k is smaller than N, which are natural numbers differently assigned by each receiving group; and
      the transmission unit transmits ACK request message to the receiving node, and the receiving unit responds to the ACK request message and receives the ACK;
    a the timer manager,
      wherein the timer manager sets a timer when there is no data frame to be transmitted by the transmission unit;
      the transmission unit transmits ACK request message against the data frame to the receiving node when the timer is expired if the ACK has not yet been received,
      the receiving unit receives ACK against previous data frame, which was transmitted before the ACK transmission time point but its ACK was not received yet, at the ACK transmission time point;
      wherein the transmitted data frame is forwarded from the receiving node to the other receiving node, and the receiving unit receives ACK against the forwarded data frame, and
      the receiving node is further contained in any one receiving group of a plurality of receiving groups together with other member node receiving data frame from the transmission node, wherein the receiving node comprises:
        a receiving unit receiving the data frame directly from the transmission node; and
        a transmission unit transmitting ACK against the data frame directly to the transmission node together with the member node at the ACK transmission time point, which is decided not to be overlapped with other receiving groups according to each receiving group containing the receiving node,
          wherein the transmission unit transmits ACK against previous data frame, which was received before the ACK transmission time point but its ACK was not transmitted yet, at the ACK transmission time point.

2. The wireless communication system according to claim 1, wherein the number of the receiving group of the grouping unit is decided in consideration of the number of the receiving node.

3. The wireless communication system according to claim 1, wherein the transmission unit transmits the previous data frame again when the ACK against the previous data frame was not received, and
  transmits the data frame again when the ACK against the data frame was not received.

4. The wireless communication system according to claim 1, wherein the receiving unit receives the previous data frame again based on the ACK against the previous data frame, and
  receives the data frame again based on the ACK against the data frame.

5. The wireless communication system according to claim 1, wherein the receiving unit receives ACK request message from the transmission node, and
  the transmission unit responses to the ACK request message and transmits the ACK.

6. A method for operating a wireless device functioning as a second transmission node in the wireless communication system according to claim 1, comprising:
  grouping a plurality of receiving nodes into a plurality of receiving groups;
  transmitting data frame directly to the receiving nodes; and
  receiving ACK against the data frame directly from the receiving node contained in each receiving group at the ACK transmission time point, which is decided not to be overlapped with other receiving groups according to each receiving group,
  wherein the step of receiving receives ACK against previous data frame, which was transmitted before the ACK transmission time point but its ACK was not received yet, at the ACK transmission time point.

7. The method according to claim 6, which further comprises a step of transmitting the previous data frame again when the ACK against the previous data frame was not received, or a step of transmitting the data frame again when the ACK against the data frame was not received.

8. The method according to claim 6, which further comprises a step of transmitting ACK request message to the receiving node, and
  the step of receiving responses to the ACK request message and receives the ACK.

9. The method according to claim 8, which further comprises a step of setting a timer when there is no data frame to be transmitted, and
  the step of transmitting ACK request message transmits the ACK request message against the data frame, which did not received the ACK, to the receiving node when the timer is expired.

10. The method according to claim 6, wherein the transmitted data frame is forwarded from the receiving node to the other receiving node, and
  the step of receiving receives ACK against the forwarded data frame.

11. A method for operating a wireless device functioning as a second receiving node in the wireless communication system according to claim 1, wherein the receiving node is contained in any one receiving group of a plurality of receiving groups together with other member node receiving data frame from the transmission node, comprising:
  receiving the data frame directly from the transmission node; and transmitting ACK against the data frame directly to the transmission node together with the member node at the ACK transmission time point, which is decided not to be overlapped with other receiving groups according to each receiving group containing the receiving node.

12. The method according to claim 11, which further comprises a step of receiving the previous data frame again based on the ACK against the previous data frame, or receiving the data frame again based on the ACK against the data frame.

13. The method according to claim 11, which further comprises a step of receiving ACK request message from the transmission node, and the step of transmitting responses to the ACK request message and transmits the ACK.

14. A non-transitory computer storage medium recorded with a program for running the method according to claim 6.

15. A non-transitory computer storage medium recorded with a program for running the method according to claim 11.

* * * * *